US011373267B2

(12) United States Patent
Wang et al.

(10) Patent No.: US 11,373,267 B2
(45) Date of Patent: Jun. 28, 2022

(54) METHODS AND APPARATUS FOR REDUCING THE TRANSFER OF RENDERING INFORMATION

(71) Applicant: QUALCOMM Incorporated, San Diego, CA (US)

(72) Inventors: Tao Wang, Sunnyvale, CA (US); Shambhoo Khandelwal, Santa Clara, CA (US); Andrew Evan Gruber, Arlington, MA (US); Shangmei Yu, Sunnyvale, CA (US); Jing Gao, San Jose, CA (US); Junmei Shao, San Diego, CA (US); Thomas Edwin Frisinger, Shrewsbury, MA (US); Rick Hammerstone, Tyngsboro, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/673,564

(22) Filed: Nov. 4, 2019

(65) Prior Publication Data
US 2021/0133912 A1 May 6, 2021

(51) Int. Cl.
G06T 1/20 (2006.01)
G06T 1/60 (2006.01)
G09G 5/393 (2006.01)

(52) U.S. Cl.
CPC ............... G06T 1/20 (2013.01); G06T 1/60 (2013.01); G09G 5/393 (2013.01)

(58) Field of Classification Search
CPC ........... G06T 1/20; G06T 1/60; G06T 15/005; G09G 5/393
See application file for complete search history.

(56) References Cited

U.S. PATENT DOCUMENTS 9,836,810 B2 12/2017 Balci et al.
2011/0298814 A1* 12/2011 Mathew ............... G09G 5/395
345/531

(Continued)

FOREIGN PATENT DOCUMENTS

EP 3051496 A1 8/2016

OTHER PUBLICATIONS

International Search Report and Written Opinion—PCT/US2020/054576—ISAEPO—dated Dec. 3, 2020.

Primary Examiner — Jacinta M Crawford
Assistant Examiner — Donna J. Ricks
(74) Attorney, Agent, or Firm — Campbell C. Chiang; Procopio, Cory, Hargreaves & Savitch LLP

(57) ABSTRACT

The present disclosure relates to methods and apparatus for graphics processing. Aspects of the present disclosure can determine a portion of a display area, where the portion of the display area is determined based on display content of the display area. Further, aspects of the present disclosure can communicate display information corresponding to the determined portion of the display area. Additionally, aspects of the present disclosure can update the display information corresponding to the determined portion of the display area. Aspects of the present disclosure can also communicate the updated display information corresponding to the determined portion of the display area. Aspects of the present disclosure can also render at least some display content of the display area corresponding to the determined portion of the display area. In some aspects, the updated display information can be based on the rendered display content of the display area.

40 Claims, 6 Drawing Sheets

(56) References Cited

U.S. PATENT DOCUMENTS

| | | | |
|---|---|---|---|
| 2013/0069943 A1* | 3/2013 | Kallio | G06T 15/005 345/420 |
| 2014/0198119 A1 | 7/2014 | Seetharamaiah et al. | |
| 2018/0286016 A1 | 10/2018 | Bar-On et al. | |
| 2018/0286101 A1* | 10/2018 | Tanner | G06T 1/20 |

* cited by examiner

METHODS AND APPARATUS FOR REDUCING THE TRANSFER OF RENDERING INFORMATION

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus can determine a portion of a display area or intermediate render target buffers, where the portion of the display area can be determined based on display content of the display area or intermediate render target buffers. The apparatus can also communicate display information corresponding to the determined portion of the display area or intermediate render target buffers. Additionally, the apparatus can update the display information corresponding to the determined portion of the display area. The apparatus can also communicate the updated display information corresponding to the determined portion of the display area or intermediate render target buffers. The apparatus can also render at least some display content of the display area corresponding to the determined portion of the display area or intermediate render target buffers. Further, the apparatus can determine the display information corresponding to the determined portion of the display area or intermediate render target buffers. The apparatus can also copy the display information corresponding to the determined portion of the display area from a system memory to a GPU internal memory (GMEM). The apparatus can also store the updated display information corresponding to the determined portion of the display area in a GMEM. The apparatus can also copy the updated display information corresponding to the determined portion of the display area to the GMEM. The apparatus can also store the updated display information corresponding to the determined portion of the display area in a system memory or a dynamic random access memory (DRAM). The apparatus can also copy the updated display information corresponding to the determined portion of the display area to the system memory or the DRAM. The apparatus can also identify the determined portion of the display area based on the display content of the display area.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
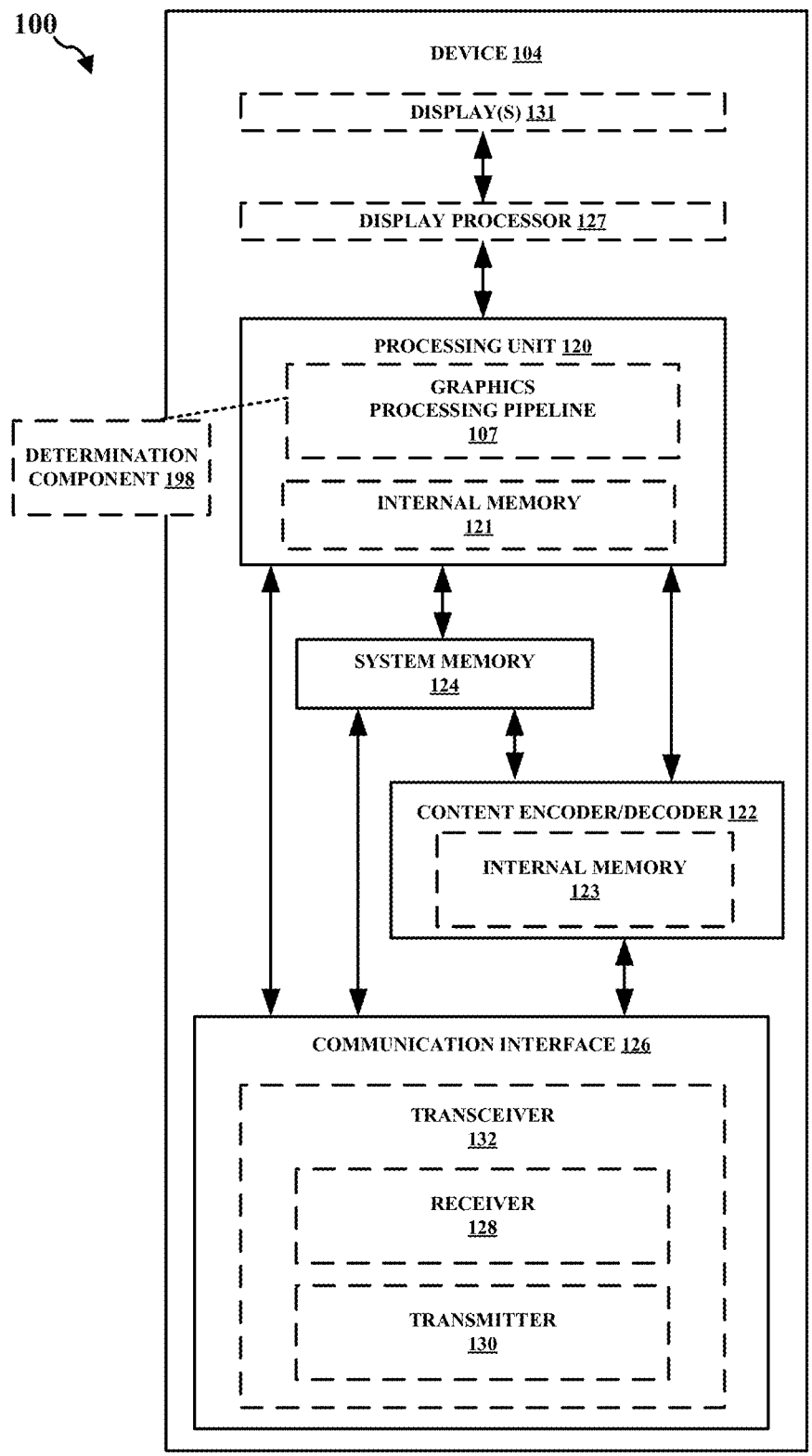
FIG. 1 is a block diagram that illustrates an example content generation system in accordance with one or more techniques of this disclosure.

Some GPUs may perform unresolve and resolve operations for an entire tile or bin, even when the entire tile or bin is not being rendered. By doing so, these GPUs are transferring an unnecessary amount of data corresponding to the tile, e.g., from the system memory to the GMEM and back again. Further, unresolving and resolving an entire tile or bin can waste memory bandwidth and system power when a portion of the tile is being rendered. By reducing the amount of data copied or transferred between the system memory and the GPU memory, the GPU performance can be improved and/or the GPU power consumption can be reduced. Aspects of the present disclosure can reduce the amount of unnecessary unresolve and resolve operations by transferring data corresponding to the rendered area of the tile. Accordingly, aspects of the present disclosure may not transfer all the data or information for each tile. In order to reduce the unnecessary unresolve and resolve operations, aspects of the present disclosure can determine or transfer data corresponding to the rendered area of a tile. In some aspects, this can be referred to as a conditional unresolve and resolve mechanism, which can improve the GPU performance and/or reduce the GPU power consumption.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine a portion of a display area or intermediate render target buffers, where the portion of the display area can be determined based on display content of the display area or intermediate render target buffers. The determination component 198 can also be configured to communicate display information corresponding to the determined portion of the display area or intermediate render target buffers. The determination component 198 can also be configured to update the display information corresponding to the determined portion of the display area or intermediate render target buffers. The determination component 198 can also be configured to communicate the updated display information corresponding to the determined portion of the display area or intermediate render target buffers. The determination component 198 can also be configured to render at least some display content of the display area corresponding to the determined portion of the display area or intermediate render target buffers. The determination component 198 can also be configured to determine the display information corresponding to the determined portion of the display area or intermediate render target buffers. The determination component 198 can also be configured to copy the display information corresponding to the determined portion of the display area from a system memory to a GMEM. The determination component 198 can also be configured to store the updated display information corresponding to the determined portion of the display area in a GPU internal memory (GMEM). The determination component 198 can also be configured to copy the updated display information corresponding to the determined portion of the display area to the GMEM. The determination component 198 can also be configured to store the updated display information corresponding to the determined portion of the display area in a system memory or a dynamic random access memory (DRAM). The determination component 198 can also be configured to copy the updated display information corresponding to the determined portion of the display area to the system memory or the DRAM. The determination component 198 can also be configured to identify the determined portion of the display area based on the display content of the display area.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
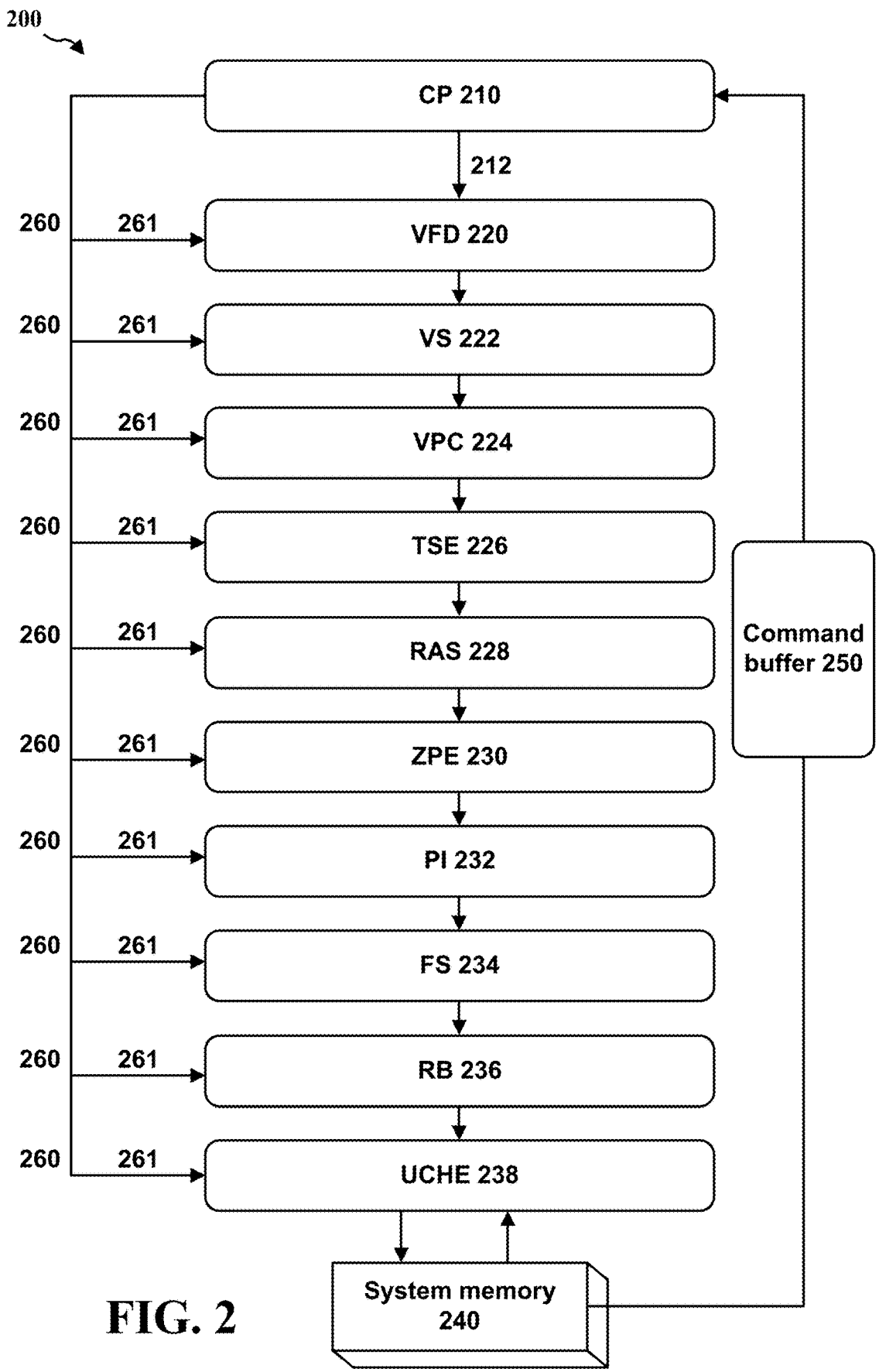
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
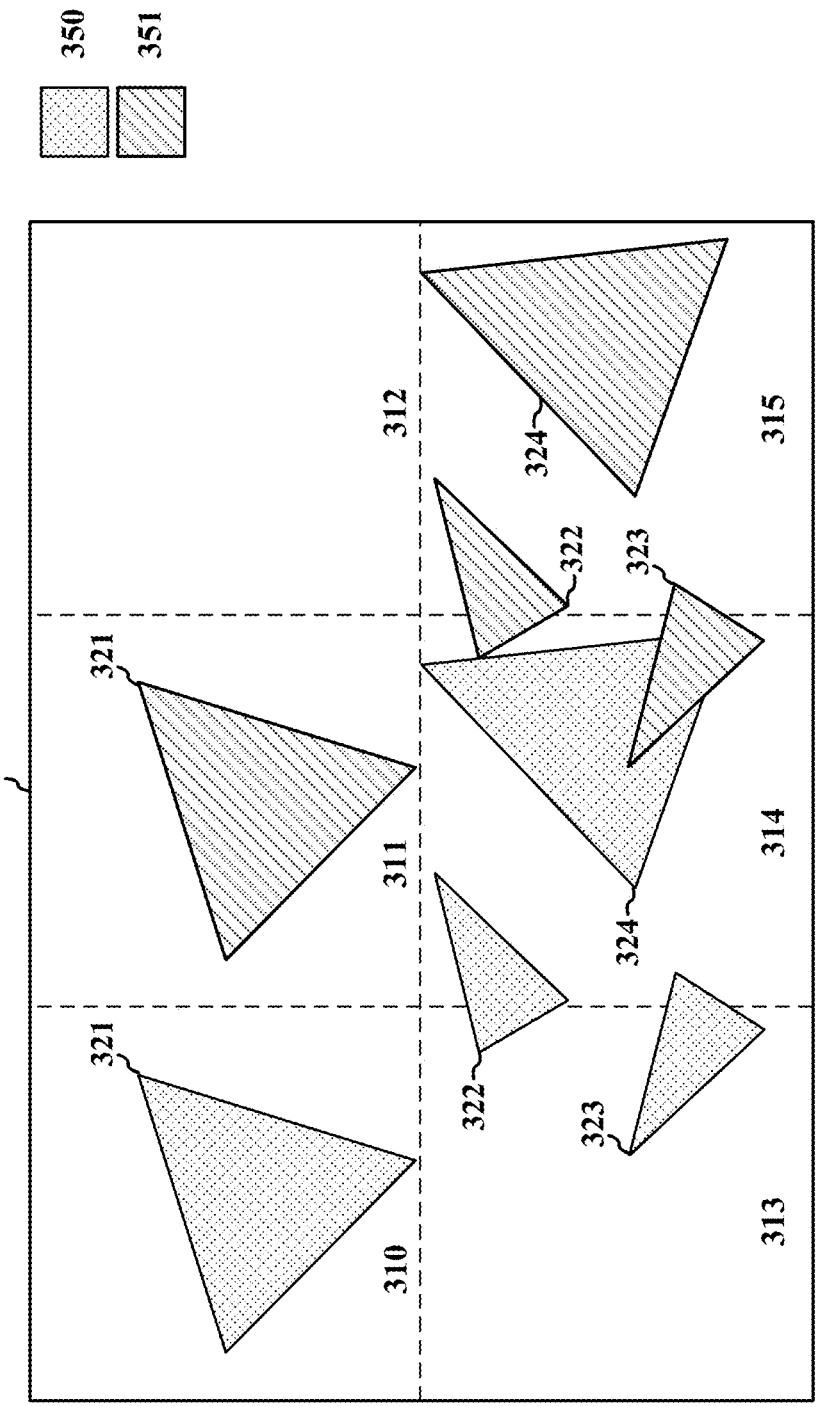
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, wherein, as discussed above, a surface is divided into multiple bins or tiles and then each bin or tile can be separately rendered. Further, in tiled rendering, the frame buffer can be partitioned into multiple bins or tiles.

Graphics applications can build or include multiple buffers, e.g., a depth buffer and/or a color buffer with a diffuse color. Also, graphics applications can build or include shadow maps, e.g., for light at the depth or color buffers. For instance, applications can run a renderer on one buffer, e.g., for a diffuse color, and then move to another buffer, e.g., to create a shadow for a different light. Graphics applications can also combine other information with previously saved information at buffers, e.g., a specular color and/or shadows on a previous color buffer.

As indicated herein, in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

As indicated herein, in bin or tiled rendering, there can be different types of memory storage, e.g., system or SoC memory and GMEM or on-chip memory, to store different data or information, e.g., the color or depth for a particular tile. In some aspects, the rendering data for each tile or bin can be transferred during an unresolve or resolve process. During the unresolve process, data or information can be moved from the system memory to the GMEM. Likewise, during the resolve process, data or information can be moved from the GMEM to the system memory. This process can then be repeated for the next bin or tile.

In some aspects, GMEM or on-chip memory can have a limited data size. Accordingly, the process of transferring rendered information from the GMEM to the system memory or frame buffer can be performed on a tile-by-tile basis. For example, the GMEM can have a size to store colors of 256×256 pixels, which can correspond to the size of a tile. A frame buffer or system memory can have a larger data size compared to the size of the GMEM, e.g., can store colors of 1920×1080 pixels. In some aspects, when partitioning a frame buffer, e.g., 1920×1080 pixels, this can be performed in multiple steps based on the size of each tile, e.g., 256×256 pixels.

As mentioned above, when storing or writing data or information to the system memory or frame buffer, a tile or bin can be unresolved when moving data or information from the system memory to the GMEM. Also, a tile or bin can be resolved when moving data or information from the GMEM to the system memory. For example, the resolving process can transfer data or information the size of a tile, e.g., 256×256 pixels, to the system memory. Aspects of the present disclosure can then move to another tile and continue the unresolve/resolve process, such as by unresolving the tile from the system memory to GMEM, rendering the tile, and then resolving the tile from the GMEM to the system memory. This process can continue until the entire frame buffer is filled.

As indicated herein, data for each tile can be moved from the system memory to the GMEM, i.e., the unresolve process, and then after rendering the data can be moved from the GMEM back to the system memory, i.e., the resolve process. Thus, the unresolve process can be an inverse movement of data compared to the resolve process. This unresolve/resolve process can be performed because the GPU memory or GMEM may be able to store less information compared to the system memory. So once rendered, tile data can be moved from the GMEM back to the frame buffer and stored on the system memory. As such, the rendered data for a tile can be transferred to the frame buffer on the system memory. Also, in some aspects, during the unresolve process, data stored at the frame buffer can be transferred to the GMEM when it is needed to render a tile at the GPU. Accordingly, a portion of the frame buffer data can be transferred from the system memory to the GMEM, and after rendering based on this data, the data can be transferred back to the frame buffer at the system memory. This process can be performed for each bin or tile until the entire surface is finished rendering.

Additionally, in some aspects, each tile can be rendered multiple rendering times, such that a portion of a tile is rendered. Accordingly, rendering data can be transferred multiple times back and forth between the system memory and the GMEM during the unresolve/resolve process. For example, GPUs can render one aspect of a surface or tile, e.g., a background, and this data can be stored at the system memory while other aspects of the surface or tile are rendered. This data can then be transferred back to the GPU when rendering another part of a scene, e.g., a character. This process can also be referred to as rendering in multiple paths.

Further, GPUs can render different aspects of a scene at different times. For example, the diffuse color of a scene can be rendered, then the spectral color, and then the shadows. So a frame buffer can store data incrementally when the tile or bin is rendered in multiple paths. Also, during the process of rendering each bin or tile, data can be transferred back and forth between the system memory and the GPU memory multiple times.

In bin rendering GPUs, switching back to a previous rendered surface can involve a number of different operations for each bin. For example, certain data, e.g., color and depth data, for a bin can be moved from a buffer, e.g., a color and depth buffer in the system memory, to GPU internal memory for color and depth. As mentioned above, this process can be referred to as an unresolve process. The bin or tile can then be rendered based on the data, e.g., color and depth data. The data, e.g., color and depth data, can then be moved from GPU internal memory for color and depth to a buffer, e.g., color and depth buffer, in the system memory. As mentioned above, this process can be referred to as a resolve process.

In some instances, when unresolving a tile or bin, the entire tile can be transferred from the system memory to the GMEM prior to rendering the tile. After rendering, the entire tile can be resolved from the GMEM to the system memory. So when transferring certain data for a tile in order to render the tile, e.g., to and/or from the system memory and the GMEM, the data for the entire tile may be transferred. As indicated herein, it may take both GPU power and performance in order to transfer data from the system memory to the GMEM, and vice versa, for the unresolve and resolve processes.

Figure 4:
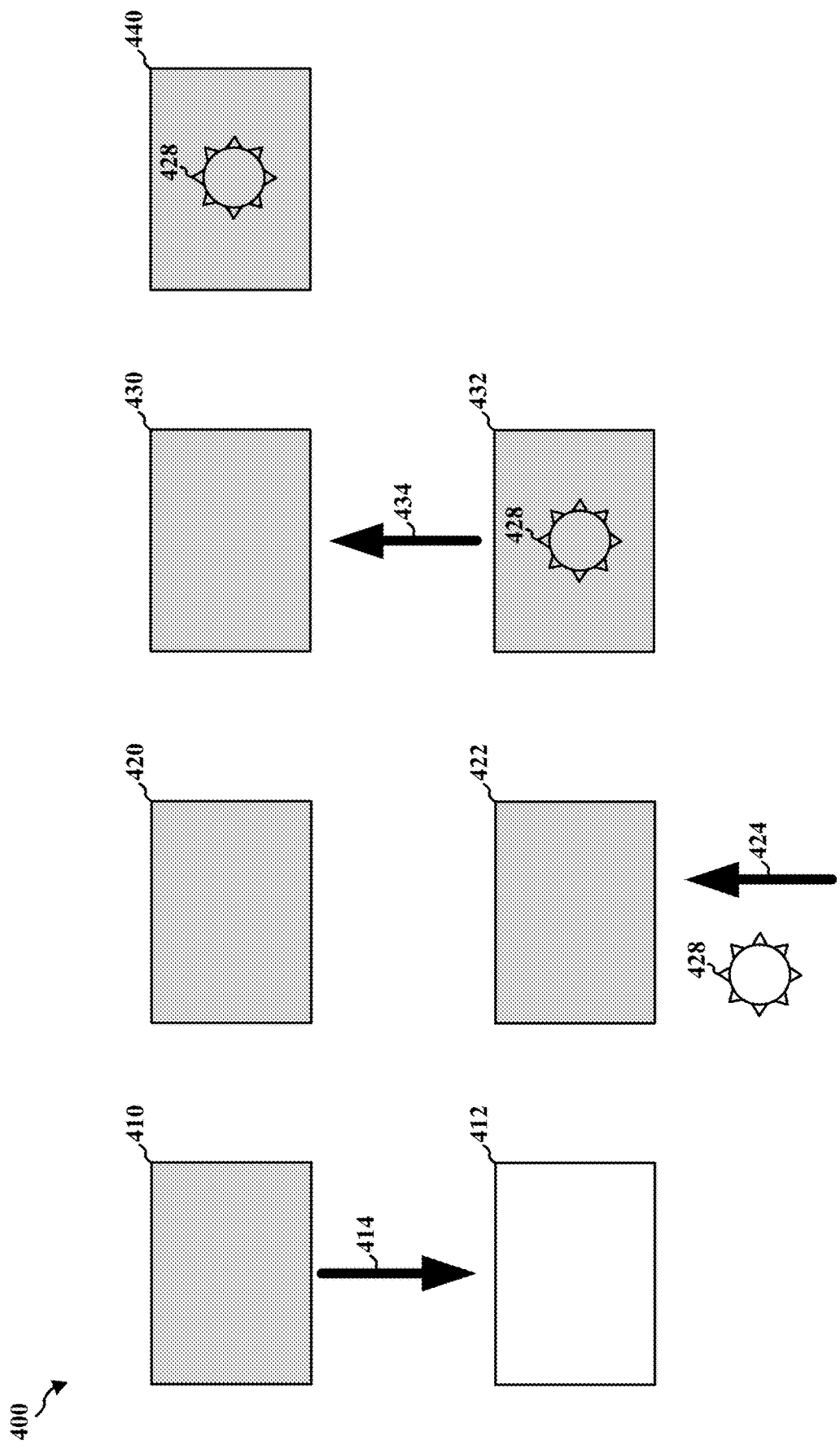
FIG. 4 illustrates an example diagram including a system memory and a GMEM in accordance with one or more techniques of this disclosure.

FIG. 4 illustrates an example diagram 400 including a system memory and a GMEM in accordance with one or more techniques of this disclosure. As shown in FIG. 4, diagram 400 includes system memory 410, system memory 420, system memory 430, system memory 440, GMEM 412, GMEM 422, GMEM 432, display content 428, unresolve process 414, rendering 424, resolve process 434. The system memory at 410/420/430/440 can represent the system memory at a GPU or CPU during different times of the unresolve/resolve process. The GMEM 412/422/432 can represent the GMEM at a GPU during different times of the unresolve/resolve process.

As shown in FIG. 4, during unresolve process 414, data or information for a tile can be moved from system memory 410 to GMEM 412. During rendering 424, the display content 428, e.g., a sun, can be rendered for the tile. After rendering, the data or information for the display content 428 can be written or stored to the GMEM 422. After the data or information for the display content 428 has been copied and/or stored at the GMEM 432, the data or information for the display content 428 can be moved from the GMEM 432 to the system memory 430 during the resolve process 434. The data or information for the display content 428 can then be copied or stored to the system memory 440.

FIG. 4 displays that in some aspects, a portion of the tile can be updated, e.g., the sun, but the data for the entire tile may be transferred from the system memory to the GMEM and back. By transferring the data for the entire tile, this can waste a lot of memory bandwidth. As a certain portion of the tile is rendered, the entire area of the tile is not rendered. This can also apply to certain rendering operations, e.g., when rendering color and depth memory. In some aspects, during bin rendering, a significant portion of the data or information for a bin or tile may not be written or updated after rendering. For example, portions of the GMEM may not need to be updated when rendering. As shown in FIG. 4, the sun is being rendered at 424, so other portions of the bin or tile may not need rendering.

As indicated herein, the unresolve and resolve operations may not be needed for areas of a bin or tile that are not rendered. For instance, a portion of the frame buffer is updated when a portion of the tile is rendered, so the data for the entire tile may not need to be transferred to the frame buffer or system memory. Further, blindly unresolving and resolving an entire tile or bin can waste memory bandwidth and system power when a portion of the tile is being rendered. So the unresolving and resolving process can waste a lot of bandwidth by moving data for an entire tile from the system memory to the GMEM and back again. By reducing the amount of data or memory copied or transferred between the system memory and the GPU memory, the GPU performance can be improved and/or the GPU power consumption can be reduced.

Aspects of the present disclosure can reduce the amount of unnecessary unresolve and resolve operations by transferring data or information corresponding to the area of the bin or tile that is to be rendered. Accordingly, aspects of the present disclosure may not transfer all the data or information for each tile. In order to reduce the unnecessary unresolve and resolve operations, aspects of the present disclosure can determine or detect the rendering area of the bin or tile, e.g., when rendering color and depth memory. So GPUs according to the present disclosure may unresolve and resolve rendered areas of the bin or tile. In some aspects, this can be referred to as a conditional unresolve and resolve mechanism.

Aspects of the present disclosure may detect the area being rendered, so that data or information corresponding to the rendered area of the tile is transferred. As such, the data for the necessary area of the tile from the frame buffer, e.g., a small portion of the frame buffer, may be transferred to and/or from the system memory and the GMEM. In some instances, aspects of the present disclosure can also transfer an entire tile, but update a portion of the tile. This can be a conditional update where the portions of the tile that may need updating are actually updated, such that aspects of the present disclosure may not update or render the unnecessary portions of the tile that do not need updating or rendering.

As indicated above, aspects of the present disclosure may unresolve the portion of a bin or tile that is updated or rendered by the GPU, i.e., a conditional unresolve process. Also, after rendering display content or updating information for the rendered display content, aspects of the present disclosure may resolve the necessary portion of the bin or tile, i.e., a conditional resolve process. By conditionally unresolving and resolving information for the rendered portion of the tile, aspects of the present disclosure can utilize the GPU bandwidth and power for the rendered or updated portions of the tile. Additionally, aspects of the present disclosure may identify the rendering area of the tile, such that the data for that specific rendering area is transferred between the system memory and GMEM, and vice versa.

The present disclosure can also utilize previously rendered portions of a tile, such that data corresponding to these previously rendered portions of the tile is transferred back and forth from the system memory to the GMEM, and vice versa. Moreover, GPUs according to the present disclosure can determine a portion of the tile or data to be rendered, and then transfer this information back and forth between the system memory in the GPU memory. By doing so, the present disclosure may not transfer all the data or memory for each bin or tile, and thereby save GPU performance and power consumed.

In some aspects, the present disclosure can determine the location of the rendered area of the tile while rendering or updating this area. By determining the location of the rendering area, the data for this area may be moved from the system memory to the GMEM, and then the data for this specific area can be updated. So the present disclosure may determine or identify the area of the tile being rendered, such that the data corresponding to the rendered area can be transferred based on this determination of the rendering area.

Therefore, the present disclosure can process a portion of the bin or tile and then once the rendered area of the tile is determined, the data for this portion of the tile can be transferred from the system memory to the GMEM during the unresolve process. After updated or rendering this area of the tile, the data for this portion of the tile can be transferred from the GMEM to the system memory during the resolve process.

In some aspects, the present disclosure can determine when the frame buffer will be updated based on the data or information transferred to and from the frame buffer. For example, an application can determine when the frame buffer will be updated and inform the GPU driver when to transfer data to/from the frame buffer. Also, the GPU driver can inform the GPU when it is time to unresolve data from the system memory to the GPU memory, as well as when it is time to resolve the data from the GPU memory to the system memory. In some aspects, the GPU driver can also translate the application command to the GPU command.

In some instances, the unresolve/resolve operation can be performed on a tile-by-tile basis, such that the driver can inform the GPU that the rendering process will continue and the frame buffer will continue to be updated. Accordingly, the GPU can transfer data for a particular tile, update the frame buffer during the draw call, and then transfer the data from the GMEM to the system memory.

As indicated herein, aspects of the present disclosure may unresolve the data for a portion of a tile on demand and when necessary. The present disclosure can determine the location of the update, and during the draw call, the GPU can update the frame buffer with the data for the rendered area of the tile. In some aspects, the present disclosure can generate the location of the tile area, e.g., the x-y coordinate data in the frame, prior to performing any other functions for this area. For instance, GPUs herein can determine the x-y coordinate data of an updated area, and then perform shading on that updated area and/or update the color of the x-y coordinate data. So once the location is known, the frame buffer data can be transferred from the system memory to the GMEM, then the data for this area can be updated. After rendering, the data for the area can be updated, and the present disclosure can transfer the updated data for this area. So rather than moving the entire data for a tile, the present disclosure can move the updated data for the rendered area of the tile. As indicated herein, this process can be referred to as an on-demand update.

Aspects of the present disclosure can perform a number of steps for the aforementioned conditional unresolve/resolve process. For instance, GPUs herein can determine and transfer the data for an area of a tile that will be rendered from the system memory to the GMEM, i.e., the GPU can unresolve the data for the tile area. The GPU can then render the area of the tile corresponding to the data that is transferred to the GMEM. For example, the GPU can render a new object in the tile. After rendering, the data for the rendered area can be updated. The updated data for the rendered area can then be stored and/or copied to the GMEM. The updated data for the rendered area can then be transferred from the GMEM to the system memory. Finally, the data for the rendered area can be stored and/or copied to the system memory.

As mentioned above, aspects of the present disclosure can determine a portion of the tile to be rendered. Data for this tile area can be transferred or communicated from the system memory to the GMEM. In some aspects, this data transfer can occur at the same time as the rendering. The present disclosure can then render this area of the tile and/or update the data for this rendered area. The data update can be performed incrementally. The data for this rendered area can then be stored or copied at the GMEM, before being transferred or communicated to the system memory. The data for this rendered area can then be stored or copied at the system memory or DRAM. In some aspects, the data for this rendered area can also be stored or copied in the frame buffer.

Figure 5:
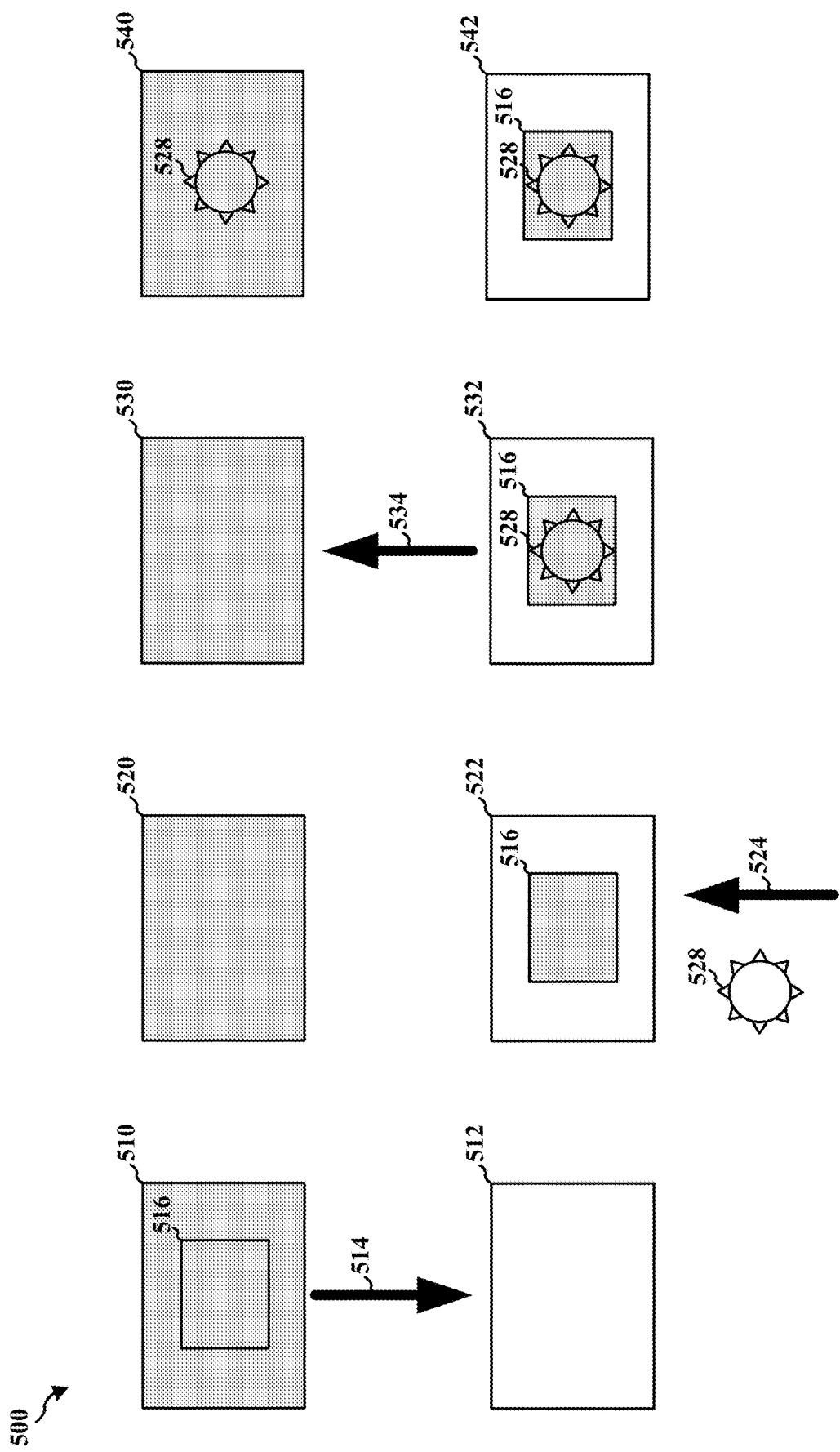
FIG. 5 illustrates an example diagram including a system memory and a GMEM in accordance with one or more techniques of this disclosure.

FIG. 5 illustrates an example diagram 500 including a system memory and a GMEM in accordance with one or more techniques of this disclosure. As shown in FIG. 5, diagram 500 includes system memory 510, system memory 520, system memory 530, system memory 540, GMEM 512, GMEM 522, GMEM 532, GMEM 542, area 516, display content 528, unresolve process 514, rendering 524, resolve process 534. The system memory at 510/520/530/540 can represent the system memory at a GPU or CPU during different times of the unresolve/resolve process. The GMEM 512/522/532/534 can represent the GMEM at a GPU during different times of the unresolve/resolve process.

As shown in FIG. 5, area 516 is a portion of a tile that is to be rendered, which can be determined based on the display content. Area 516 can comprise less than the entire area of the tile. During unresolve process 514, data or information for the area 516 can be moved or communicated from system memory 510 to GMEM 512. During rendering 524, the display content 528 of area 516, e.g., a sun, can be rendered. After rendering, the data or information for the display content 528 of area 516 can be updated based on the rendering. The data or information for the display content 528 of area 516 can be written, copied, or stored to the GMEM 532. After the data or information for the display content 528 of area 516 has been copied and/or stored at the GMEM 532, the data or information for the display content 528 of area 516 can be moved or communicated from the GMEM 532 to the system memory 530 during the resolve process 534. The data or information for the display content 528 of area 516 can then be copied or stored to the system memory 540. As shown in FIG. 5, the data or information for the display content 528 of area 516 can be stored at GMEM 542 and system memory 540.

FIG. 5 displays that in some aspects, an area of a tile can be rendered or updated, e.g., the sun, and the data for that tile area may be transferred from the system memory to the GMEM and back. By transferring the data for the tile area that is rendered, the present disclosure can save a significant amount of GPU power and/or memory bandwidth. As a certain portion of the tile is rendered, the data for the entire area of the tile does not need to be transferred. This can also apply to certain rendering operations, e.g., when rendering color and depth memory. In some aspects, a significant portion of the data or information for a bin or tile may not be updated or rendered. As shown in FIG. 5, the sun in area 516 is being rendered at 524, and other portions of the tile may not need rendering, such that data corresponding to these other portions of the tile may not need to be communicated or transferred.

FIG. 5 displays that the display content for an area 516 of the tile is rendered, e.g., the sun is rendered, and the data for that particular area 516 of the tile, e.g., data corresponding to the sun, is transferred back and forth from the system memory to the GMEM. As indicated above, by transferring the data corresponding to a rendered area of the tile, e.g., area 516, this can save a lot of GPU power and/or memory bandwidth. After the display content for the area 516 is rendered, the present disclosure can update the data corresponding to area 516 that will be transferred back to the system memory from the GMEM. In some aspects, the rendering of display content at area 516 can take place at the same time as the data for area 516 is transferred from the system memory to the GMEM.

FIG. 5 illustrates an example of the aforementioned processes for communicating tile information during an unresolve and resolve process. As shown in FIG. 5, aspects of the present disclosure, e.g., CPUs and GPUs herein, can perform a number of different steps or processes to communicate data or information for a portion of a tile in an unresolve and resolve process. For instance, GPUs herein can determine a portion of a display area, e.g., area 516, or intermediate render target buffers, where the portion of the display area can be determined based on display content of the display area or intermediate render target buffers. In some aspects, the portion of the display area, e.g., area 516, can be determined by a CPU or a GPU. GPUs herein can also identify the determined portion of the display area, e.g., area 516, based on the display content of the display area or intermediate render target buffers.

Additionally, GPUs herein can determine the display information corresponding to the determined portion of the display area, e.g., area 516, or intermediate render target buffers. GPUs herein can also copy the display information corresponding to the determined portion of the display area, e.g., area 516, from a system memory, e.g., system memory 510, to a GMEM, e.g., GMEM 532. GPUs herein can also communicate, e.g., during unresolve process 514, the display information corresponding to the determined portion of the display area, e.g., area 516, or intermediate render target buffers. In some aspects, GPUs herein can transmit, e.g., during unresolve process 514, the display information corresponding to the determined portion of the display area, e.g., area 516, to a GMEM, e.g., GMEM 512.

GPUs herein can also render, e.g., at rendering 524, at least some display content, e.g., display content 528, of the display area corresponding to the determined portion of the display area, e.g., area 516, or intermediate render target buffers. GPUs herein can also update the display information corresponding to the determined portion of the display area, e.g., area 516, or intermediate render target buffers. In some aspects, the updated display information corresponding to the determined portion of the display area, e.g., area 516, can be based on the rendered, e.g., at rendering 524, at least some display content, e.g., display content 528, of the display area. In some aspects, the updated display information corresponding to the determined portion of the display area, e.g., area 516, can be incrementally updated, such that at least some information of the updated display information is updated separately from at least some other information of the updated display information.

Moreover, GPUs herein can copy the updated display information corresponding to the determined portion of the display area, e.g., information corresponding to display content 528 of area 516, to the GMEM, e.g., GMEM 532. GPUs herein can also store the updated display information corresponding to the determined portion of the display area, e.g., information corresponding to display content 528 of area 516, in a GMEM, e.g., GMEM 532.

GPUs herein can also communicate, e.g., during resolve process 534, the updated display information corresponding to the determined portion of the display area, e.g., information corresponding to display content 528 of area 516. In some aspects, GPUs herein can transmit, e.g., during resolve process 534, the updated display information corresponding to the determined portion of the display area, e.g., information corresponding to display content 528 of area 516, to a system memory or a DRAM, e.g., system memory 530. Additionally, GPUs herein can copy the updated display information corresponding to the determined portion of the display area, e.g., information corresponding to display content 528 of area 516, to the system memory or the DRAM, e.g., system memory 540. GPUs herein can also store the updated display information corresponding to the determined portion of the display area, e.g., information corresponding to display content 528 of area 516, in a system memory or a DRAM, e.g., system memory 540.

In some aspects, a rasterizer of the GPU can inform the resolve engine of which areas of the tile will be rendered. Additionally, in some aspects, the resolve engine may load color and/or depth information for these rendered areas from the system memory to the GMEM or GPU internal memory. Also, a render backend can record which areas of the tile are updated, e.g., based on the rendering. Further, the resolve engine may move the colors and depths of updated areas from the GPU internal memory or GMEM to the system memory.

The aforementioned aspects of the present disclosure can include a number of advantages. For example, the conditional unresolve and resolve mechanism herein can reduce the GPU memory workload, improve GPU performance, and/or reduce power consumption. Additionally, the amount of transferred data corresponding to the rendered area can be reduced as aspects of the present disclosure may not transfer the data for the entire tile. For example, as the present disclosure may not transfer the data for the entire tile, aspects of the present disclosure can improve the GPU performance and/or reduce power consumption.

Figure 6:
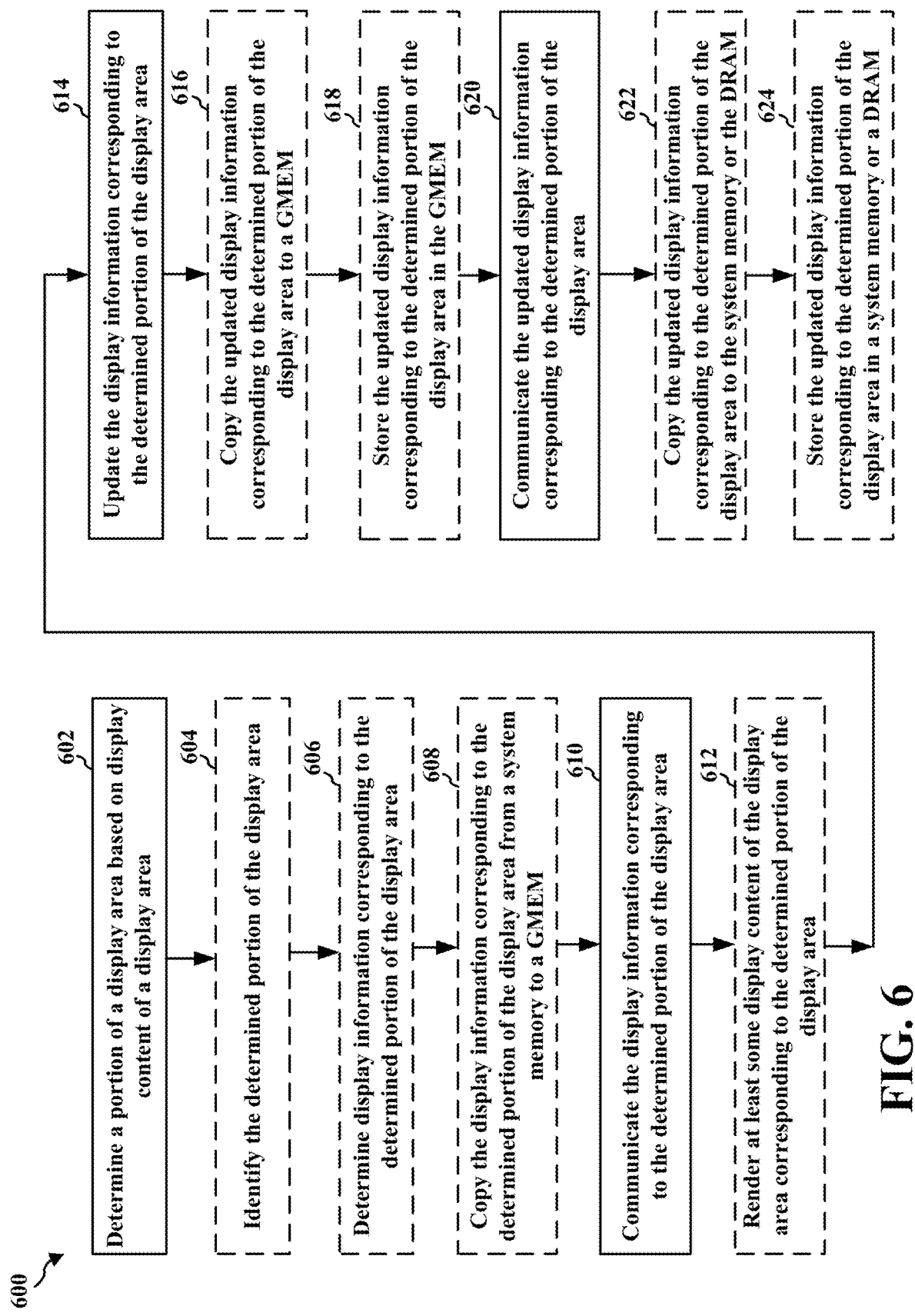
FIG. 6 illustrates an example flowchart of an example method in accordance with one or more techniques of this disclosure.

FIG. 6 illustrates an example flowchart 600 of an example method in accordance with one or more techniques of this disclosure. The method may be performed by an apparatus such as a CPU, a GPU, or an apparatus for graphics processing. At 602, the apparatus may determine a portion of a display area or intermediate render target buffers, where the portion of the display area can be determined based on display content of the display area or intermediate render target buffers, as described in connection with the examples in FIGS. 3, 4, and 5. In some aspects, the portion of the display area can be determined by a central processing unit (CPU) or graphics processing unit (GPU), as described in connection with the examples in FIGS. 3, 4, and 5. At 604, the apparatus can identify the determined portion of the display area based on the display content of the display area or intermediate render target buffers, as described in connection with the examples in FIGS. 3, 4, and 5.

At 606, the apparatus can determine the display information corresponding to the determined portion of the display area or intermediate render target buffers, as described in connection with the examples in FIGS. 3, 4, and 5. At 608, the apparatus can copy the display information corresponding to the determined portion of the display area from a system memory to a GMEM, as described in connection with the examples in FIGS. 3, 4, and 5. At 610, the apparatus can communicate the display information corresponding to the determined portion of the display area or intermediate render target buffers, as described in connection with the examples in FIGS. 3, 4, and 5. In some aspects, the apparatus can transmit the display information corresponding to the determined portion of the display area to a GPU internal memory (GMEM), as described in connection with the examples in FIGS. 3, 4, and 5.

At 612, the apparatus can render at least some display content of the display area corresponding to the determined portion of the display area or intermediate render target buffers, as described in connection with the examples in FIGS. 3, 4, and 5. At 614, the apparatus can update the display information corresponding to the determined portion of the display area, as described in connection with the examples in FIGS. 3, 4, and 5. In some aspects, the updated display information corresponding to the determined portion of the display area can be based on the rendered at least some display content of the display area, as described in connection with the examples in FIGS. 3, 4, and 5. In some aspects, the updated display information corresponding to the determined portion of the display area can be incrementally updated, such that at least some information of the updated display information is updated separately from at least some other information of the updated display information, as described in connection with the examples in FIGS. 3, 4, and 5.

At 616, the apparatus can copy the updated display information corresponding to the determined portion of the display area to a GMEM, as described in connection with the examples in FIGS. 3, 4, and 5. At 618, the apparatus can store the updated display information corresponding to the determined portion of the display area in the GMEM, as described in connection with the examples in FIGS. 3, 4, and 5.

At 620, the apparatus can communicate the updated display information corresponding to the determined portion of the display area or intermediate render target buffers, as described in connection with the examples in FIGS. 3, 4, and 5. In some aspects, the apparatus can transmit the updated display information corresponding to the determined portion of the display area to a system memory or a dynamic random access memory (DRAM), as described in connection with the examples in FIGS. 3, 4, and 5. At 622, the apparatus can copy the updated display information corresponding to the determined portion of the display area to the system memory or the DRAM, as described in connection with the examples in FIGS. 3, 4, and 5. At 624, the apparatus can also store the updated display information corresponding to the determined portion of the display area in a system memory or a DRAM, as described in connection with the examples in FIGS. 3, 4, and 5.

In one configuration, a method or apparatus for graphics processing is provided. The apparatus may be a CPU, a GPU, or some other processor that can perform graphics processing. In one aspect, the apparatus may be the processing unit 120 within the device 104, or may be some other hardware within device 104 or another device. The apparatus may include means for determining a portion of a display area or intermediate render target buffers, where the portion of the display area can be determined based on display content of the display area or intermediate render target buffers. The apparatus may include means for communicating display information corresponding to the determined portion of the display area or intermediate render target buffers. Additionally, the apparatus may include means for updating the display information corresponding to the determined portion of the display area or intermediate render target buffers. The apparatus may also include means for communicating the updated display information corresponding to the determined portion of the display area or intermediate render target buffers. The apparatus may also include means for rendering at least some display content of the display area corresponding to the determined portion of the display area or intermediate render target buffers. The apparatus may also include means for determining the display information corresponding to the determined portion of the display area or intermediate render target buffers. The apparatus may also include means for copying the display information corresponding to the determined portion of the display area from a system memory to a GMEM. The apparatus may also include means for storing the updated display information corresponding to the determined portion of the display area in a GMEM. The apparatus may also include means for copying the updated display information corresponding to the determined portion of the display area to the GMEM. The apparatus may also include means for storing the updated display information corresponding to the determined portion of the display area in a system memory or a dynamic random access memory (DRAM). The apparatus may also include means for copying the updated display information corresponding to the determined portion of the display area to the system memory or the DRAM. The apparatus may also include means for identifying the determined portion of the display area based on the display content of the display area.

The subject matter described herein can be implemented to realize one or more benefits or advantages. For instance, the described graphics processing techniques can be used by a GPU, a CPU, or some other processor that can perform graphics processing to implement the resolve and unresolve techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize a conditional information transfer that can reduce both time spent and money consumed during the resolve and unresolve process.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
    determining a portion of a tile of a display area, wherein the portion of the tile is determined based on display content of the display area, wherein the portion of the tile corresponds to display content to be rendered, wherein the portion of the tile is less than an area of the tile;
    communicating display information corresponding to the determined portion of the tile;
    updating the display information corresponding to the determined portion of the tile, wherein the updated display information corresponding to the determined portion of the display area is incrementally updated, such that at least some information of the updated display information is updated separately from at least some other information of the updated display information, wherein the updated display information corresponds to less than the area of the tile, wherein the updated display information corresponds to rendered display content;
    storing the updated display information corresponding to the determined portion of the tile, wherein the stored updated display information corresponds to less than the area of the tile; and
    communicating the updated display information corresponding to the determined portion of the tile.

2. The method of claim 1, further comprising:
    rendering at least some display content of the display area corresponding to the determined portion of the display area.

3. The method of claim 2, wherein the updated display information corresponding to the determined portion of the display area is based on the rendered at least some display content of the display area.

4. The method of claim 1, further comprising:
    determining the display information corresponding to the determined portion of the display area.

5. The method of claim 1, further comprising:
    copying the display information corresponding to the determined portion of the display area from a system memory to a graphics processing unit (GPU) internal memory (GMEM).

6. The method of claim 1, wherein communicating the display information corresponding to the determined portion of the display area further comprises:
    transmitting the display information corresponding to the determined portion of the display area to a GMEM.

7. The method of claim 1, wherein the updated display information is stored in a graphics processing unit (GPU) internal memory (GMEM).

8. The method of claim 7, further comprising:
    copying the updated display information corresponding to the determined portion of the display area to the GMEM.

9. The method of claim 1, wherein communicating the updated display information corresponding to the determined portion of the display area further comprises:
    transmitting the updated display information corresponding to the determined portion of the display area to a system memory or a dynamic random access memory (DRAM).

10. The method of claim 1, further comprising:
    storing the updated display information corresponding to the determined portion of the display area in a system memory or a DRAM.

11. The method of claim 10, further comprising:
    copying the updated display information corresponding to the determined portion of the display area to the system memory or the DRAM.

12. The method of claim 1, further comprising:
    identifying the determined portion of the display area based on the display content of the display area.

13. The method of claim 1, wherein the portion of the display area is determined by a graphics processing unit (GPU).

14. An apparatus for graphics processing, comprising:
    a memory; and
    at least one processor coupled to the memory and configured to:
        determine a portion of a tile of a display area, wherein the portion of the tile is determined based on display content of the display area, wherein the portion of the tile corresponds to display content to be rendered, wherein the portion of the tile is less than an area of the tile;
        communicate display information corresponding to the determined portion of the tile;
        update the display information corresponding to the determined portion of the tile, wherein the updated display information corresponding to the determined portion of the display area is incrementally updated, such that at least some information of the updated display information is updated separately from at least some other information of the updated display information, wherein the updated display information corresponds to less than the area of the tile, wherein the updated display information corresponds to rendered display content;

store the updated display information corresponding to the determined portion of the tile, wherein the stored updated display information corresponds to less than the area of the tile; and communicate the updated display information corresponding to the determined portion of the tile.

15. The apparatus of claim 14, wherein the at least one processor is further configured to:

render at least some display content of the display area corresponding to the determined portion of the display area.

16. The apparatus of claim 15, wherein the updated display information corresponding to the determined portion of the display area is based on the rendered at least some display content of the display area.

17. The apparatus of claim 14, wherein the at least one processor is further configured to:

determine the display information corresponding to the determined portion of the display area.

18. The apparatus of claim 14, wherein the at least one processor is further configured to:

copy the display information corresponding to the determined portion of the display area from a system memory to a graphics processing unit (GPU) internal memory (GMEM).

19. The apparatus of claim 14, wherein to communicate the display information corresponding to the determined portion of the display area further comprises the at least one processor configured to:

transmit the display information corresponding to the determined portion of the display area to a GMEM.

20. The apparatus of claim 14, wherein the updated display information is stored in a graphics processing unit (GPU) internal memory (GMEM).

21. The apparatus of claim 20, wherein the at least one processor is further configured to:

copy the updated display information corresponding to the determined portion of the display area to the GMEM.

22. The apparatus of claim 14, wherein to communicate the updated display information corresponding to the determined portion of the display area further comprises the at least one processor configured to:

transmit the updated display information corresponding to the determined portion of the display area to a system memory or a dynamic random access memory (DRAM).

23. The apparatus of claim 14, wherein the at least one processor is further configured to:

store the updated display information corresponding to the determined portion of the display area in a system memory or a DRAM.

24. The apparatus of claim 23, wherein the at least one processor is further configured to:

copy the updated display information corresponding to the determined portion of the display area to the system memory or the DRAM.

25. The apparatus of claim 14, wherein the at least one processor is further configured to:

identify the determined portion of the display area based on the display content of the display area.

26. The apparatus of claim 14, wherein the portion of the display area is determined by a graphics processing unit (GPU).

27. An apparatus for graphics processing, comprising:

means for determining a portion of a tile of a display area, wherein the portion of the tile is determined based on display content of the display area, wherein the portion of the tile corresponds to display content to be rendered, wherein the portion of the tile is less than an area of the tile;

means for communicating display information corresponding to the determined portion of the tile;

means for updating the display information corresponding to the determined portion of the tile, wherein the updated display information corresponding to the determined portion of the display area is incrementally updated, such that at least some information of the updated display information is updated separately from at least some other information of the updated display information, wherein the updated display information corresponds to less than the area of the tile, wherein the updated display information corresponds to rendered display content;

means for storing the updated display information corresponding to the determined portion of the tile, wherein the stored updated display information corresponds to less than the area of the tile; and means for communicating the updated display information corresponding to the determined portion of the tile.

28. The apparatus of claim 27, further comprising:

means for rendering at least some display content of the display area corresponding to the determined portion of the display area.

29. The apparatus of claim 28, wherein the updated display information corresponding to the determined portion of the display area is based on the rendered at least some display content of the display area.

30. The apparatus of claim 27, further comprising:

means for determining the display information corresponding to the determined portion of the display area.

31. The apparatus of claim 27, further comprising:

means for copying the display information corresponding to the determined portion of the display area from a system memory to a graphics processing unit (GPU) internal memory (GMEM).

32. The apparatus of claim 27, wherein the means for communicating the display information corresponding to the determined portion of the display area is further configured to:

transmit the display information corresponding to the determined portion of the display area to a GMEM.

33. The apparatus of claim 27, wherein the updated display information is stored in a graphics processing unit (GPU) internal memory (GMEM).

34. The apparatus of claim 33, further comprising:

means for copying the updated display information corresponding to the determined portion of the display area to the GMEM.

35. The apparatus of claim 27, wherein the means for communicating the updated display information corresponding to the determined portion of the display area is further configured to:

transmit the updated display information corresponding to the determined portion of the display area to a system memory or a dynamic random access memory (DRAM).

36. The apparatus of claim 27, further comprising:

means for storing the updated display information corresponding to the determined portion of the display area in a system memory or a DRAM.

37. The apparatus of claim 36, further comprising:
means for copying the updated display information corresponding to the determined portion of the display area to the system memory or the DRAM.

38. The apparatus of claim 27, further comprising:
means for identifying the determined portion of the display area based on the display content of the display area.

39. The apparatus of claim 27, wherein the portion of the display area is determined by a graphics processing unit (GPU).

40. A non-transitory computer-readable medium storing computer executable code for graphics processing, the code when executed by a processor causes the processor to:
determine a portion of a tile of a display area, wherein the portion of the tile is determined based on display content of the display area, wherein the portion of the tile corresponds to display content to be rendered, wherein the portion of the tile is less than an area of the tile;
communicate display information corresponding to the determined portion of the tile;
update the display information corresponding to the determined portion of the tile, wherein the updated display information corresponding to the determined portion of the display area is incrementally updated, such that at least some information of the updated display information is updated separately from at least some other information of the updated display information, wherein the updated display information corresponds to less than the area of the tile, wherein the updated display information corresponds to rendered display content;
store the updated display information corresponding to the determined portion of the tile, wherein the stored updated display information corresponds to less than the area of the tile; and
communicate the updated display information corresponding to the determined portion of the tile.

* * * * *